United States Patent [19]
Fletcher et al.

[11] 3,790,432
[45] Feb. 5, 1974

[54] REINFORCED POLYQUINOXALINE GASKET AND METHOD OF PREPARING THE SAME

[76] Inventors: James C. Fletcher, Administrator of the National Aeronautics and Space Administration with respect to an invention of; Richard Van Auken, 12738 Metate Ln., Poway, Calif. 92064

[22] Filed: Dec. 30, 1971

[21] Appl. No.: 214,006

[52] U.S. Cl............. 161/93, 156/331, 161/42, 161/43, 161/182, 161/192, 260/2 R, 264/135, 264/136, 264/257
[51] Int. Cl............. B32b 17/04, C08g 33/02
[58] Field of Search......... 161/93, 42, 43, 182, 192; 260/2 R; 156/331; 264/88, 135, 136, 257

[56] References Cited
UNITED STATES PATENTS

| | | | |
|---|---|---|---|
| 3,326,915 | 6/1967 | Jackson et al. | 260/2 R |
| 3,475,374 | 10/1969 | Marvel et al. | 260/2 R |
| 3,484,387 | 12/1969 | Jackson et al. | 260/2 R |
| 3,620,997 | 11/1971 | Marvel | 260/2 R |
| 3,511,733 | 5/1970 | Fincke et al. | 161/93 |
| 3,700,538 | 10/1972 | Kennedy | 161/93 |

*Primary Examiner*—George F. Lesmes
*Assistant Examiner*—M. E. McCamish
*Attorney, Agent, or Firm*—L. D. Wofford, Jr. et al.

[57] ABSTRACT

A gasket or seal resistant to ionizing radiation and liquid hydrogen temperatures is made up of a laminated polyquinoxaline resin-fiberglass cloth body portion and a molded polyquinoxaline encapsulating film. The laminated body is prepared by stacking thin sheets of the resin alternately with fiberglass cloth and heating the assembly under pressure with the temperature, pressure and resin film thickness being controlled so that only partial impregnation of the fiberglass cloth is produced. The encapsulating resin film is preheated at about 300° F and applied to the laminate body by molding at a temperature of about 625° F, after which the molded gasket is deflashed and post-cured by heating at 675° to 700° F.

10 Claims, 2 Drawing Figures

RICHARD VAN AUKEN,
INVENTOR

REINFORCED POLYQUINOXALINE GASKET AND METHOD OF PREPARING THE SAME

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

This invention relates to seals, gaskets and the like, and more particularly to composite gaskets for service under extreme conditions of radiation and cryogenic temperatures.

Development of nuclear-powered space vehicles utilizing liquid hydrogen systems requires the availability of gaskets and seals which are resistant to nuclear radiation and to liquid hydrogen temperatures. Composite gaskets based on fluorocarbon polymers have been developed previously for cryogenic applications in which conventional homogeneous polymeric gaskets are not suitable owing to the problems of cold flow, reduced flexibility and reduced compressibility encountered at cryogenic temperatures. Flurorocarbon polymers, however, do not possess sufficient resistance to radiation for use in the severe radiation environment of nuclear reactor systems. Various new polymers including polyimides and polybenzimidazoles show outstanding radiation resistance, but they do not have the flexibility or lubricity of fluorocarbons. In addition, the radiation-resistant polymers generally require complex high-temperature and high-pressure processing, and the reproducibility of fabrication methods in preparation of composites from such materials has been poor.

SUMMARY OF THE INVENTION

In accordance with the present invention gaskets or similar articles are made up of a laminated body in which fiberglass cloth is partially impregnated with polyquinoxaline resin and a molded encapsulating film of the same resin. The laminate for the gasket body is prepared by heating a stacked array of alternating sheets of the polymer resin and fiberglass cloth under pressure, with the temperature, pressure and resin sheet thickness being controlled to produce a partially impregnated, compressible and resilient material. An encapsulating film of polyquinoxaline is then applied by preheating the film, disposing the film over the entire surface of the laminated gasket body, molding at a controlled temperature and post-curing by further heating. Gaskets embodying the invention show superior resistance to damage by ionizing radiation and cryogenic temperatures. The partially impregnated laminate body provides a compressible gasket cross section which maintains its compressibility over a range of temperatures from $-425°$ to $+500°$ F.

It is therefore an object of the invention to provide a gasket or similar article for service under ionizing radiation and cryogenic temperatures.

Another object is to provide a compressible, resilient gasket structure capable of maintaining compressibility at liquid hydrogen temperatures.

Another object is to provide a gasket which is impervious to liquid and gaseous hydrogen.

Still another object is to provide a gasket which is resistant to thermal cycling from temperatures of $-423°$ to $+500°$ F.

Other objects and advantages of the invention will be apparent from the following detailed description of a preferrred embodiment.

DESCRIPTION OF THE PREFERRED EMBODIMENT

Figure 1:
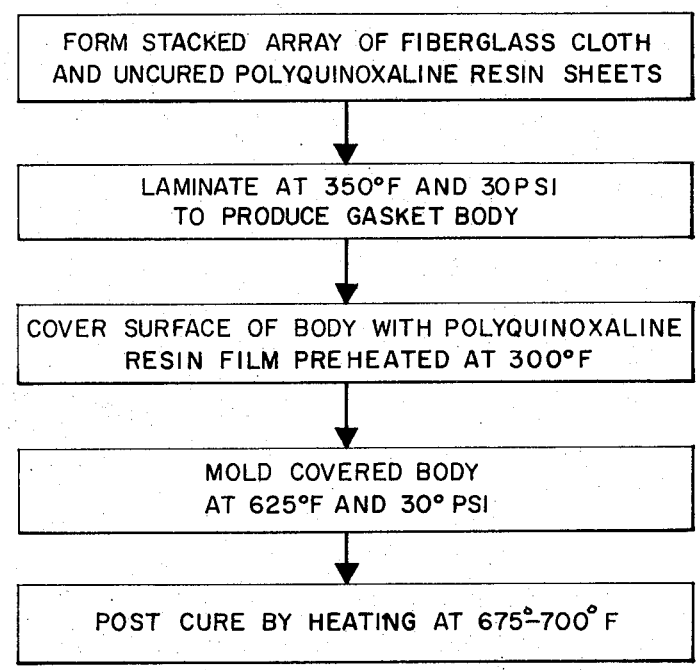
FIG. 1 is a flow chart showing the sequence of steps involved in preparing gaskets by the method of this invention.

Gaskets embodying the invention are made up of a laminated body and an encapsulating film molded onto the entire surface of the body. The laminated body can be formed by heating a stacked array of alternating fiberglass cloth and polyquinoxaline sheet or film under pressure, with the composition of the array and the lamination process conditions being controlled so as to produce only partial impregnation of the fiberglass cloth by the resin. Complete impregnation would result in a rigid, incompressible body unsuitable for use as a gasket.

Although any woven fiberglass cloth can be used for the laminate, best results are obtained by using a heat-cleaned 401 crowfoot satin weave fiberglass cloth.

The resin component for the laminate and encapsulating film can be any polyquinoxaline polymer, which class of polymers can be represented by the general formula:

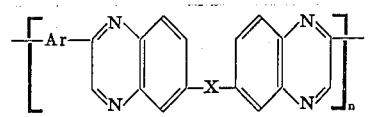

where $x = $ nil, -O-, or $SO_2$- and

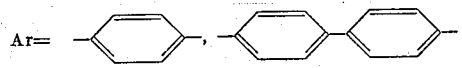

or

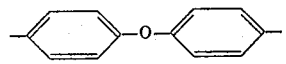

Numerous polyquinoxalines falling with this formula have been prepared and are described in the literature. A preferred polyquinoxaline resin is that having the formula

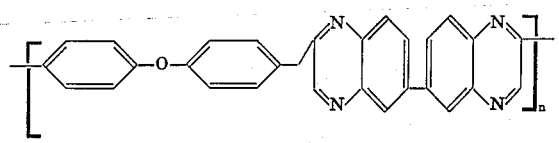

and which can be prepared by reacting a compound having the formula

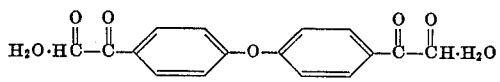

with a compound having the formula

Properties of this material are as follows: specific gravity, 1.30; polymer melt temperature, ca 265° C; polymer decomposition temperature, ca 510° C(air), 530° C (helium); and glass transition temperature, ca 388° C. It is to be understood that the process conditions of temperature, time and the like given in the following description are for the preferred type of polyquinoxaline and that minor variations will exist in the optimum values when other types of polyquinoxalines are used.

The laminate is made up by stacking alternating layers of polyquinoxaline film and the fiberglass cloth. In order to provide the required partial impregnation in laminate formation, the resin film thickness should be within the range of 1.8 to 2.2 mils, and preferably about 2 mils. Thicker film will result in loss of resiliency in the laminate. Pre-formed uncured film can be used, or films can be prepared from liquid polyquinoxaline solution by pouring the resin on a smooth surface such as glass to the desired thickness (about 8 mils for a 2 mil film) and heating by means such as heat lamps until the film surface temperature reaches 130° to 140° F so as to remove volatile solvent. Alternating layers of the film and fiberglass cloth are stacked to the desired thickness, with a minimum of five layers of fiberglass being required for a 1/16 inch thick gasket. In order to provide more isotropic properties, successive layers of the fiberglass cloth are preferably placed so that the weaves therein are diagonal to one another.

The stacked resin film-fiberglass cloth array is then subjected to heating under pressure to form the laminate. A temperature from 340° to 360° F and a pressure of 28 to 32 psi can be used, with the preferred conditions being a temperature of 350° F and a pressure of 30 psi. Under these conditions a period of 30 to 60 minutes is required for lamination. Lower temperatures will require a longer period. Laminates prepared by this procedure show a high degree of resiliency due to incomplete impregnation of the cloth with the resin. In addition, continuity of resin films in the laminate is maintained so as to provide excellent resistance to leakage through the thickness of the laminate. Shapes of the desired configuration for seals or gaskets, for example, doughnut or washer shapes can be obtained by cutting the resulting laminate.

The laminated body, or gasket blank obtained from it, is ocvered over its entire surface with a heat-treated sheet or film of polyquinoxaline and subjected to high-temperature molding. In order to avoid entrapment of gases with a resulting formation of blisters, the film starting from the uncured state is subjected to heating at an intermediate temperature, which can be from 280° to 320° F for a period of 25 to 35 minutes, with preferred conditions being about 300° F for 1/2 hour. Insufficient heating results in incomplete removal of volatiles, and excess heating requires that temperatures and pressures be unduly increased in the subsequent molding step. A thickness of at least 3.5 mils is required for the encapsulating film, and about 4 mils is preferred.

The covered laminated body is placed in a suitable fixture, preferably a precision die capable of providing close dimensional tolerances, and is molded by heating under pressure. A temperature from 600° to 650° F and a pressure of 25 to 35psi can be used, and about 625° F at 30 psi is preferred. Under these conditions a period of 30 minutes is required. Lower temperatures and pressures will necessitate a longer period.

After molding the gasket is removed from the mold, deflashed by lightly sanding the inner and outer edges, and subjected to a further heat treatment in air to effect final curing. Heating to a temperature of at least 675° F is required, and a temperature of 675° to 700° F for a period of about 30 minutes is preferred. This sequence of steps is highly reproducible, and it results in gaskets of excellent quality.

Two inch diameter gaskets prepared under the preferred conditions given above were tested before and after nuclear irradiation up to $10^{10}$ ergs/gram(c) gamma. Load deflection and leakage tests were performed over a temperature range of −423° F through +500° F. Performance was satisfactory for all conditions tested. Specimens showed no visual change or degradation after exposure to irradiation dosages of $10^{11}$ ergs/gram(c) gamma and $10^{17}$ nvt fast neutrons. The tested gaskets maintained favorable compressibility at cryogenic temperatures after irradiation to the extent indicated. Scale-up tests established that larger diameter gaskets, up to at least 12 inches in diameter, can be fabricated under the same conditions as 2 inch diameter gaskets.

Figure 2:
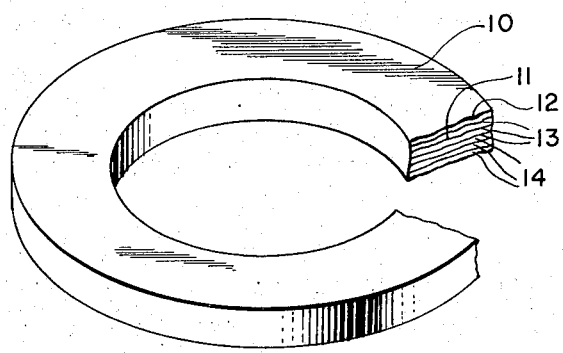
FIG. 2 is a perspective view, partially broken away, showing a gasket embodying the invention.

FIG. 2 shows a gasket embodying the invention and prepared by the process described above. The gasket 10 includes a laminated body portion 11 and an encapsulating film 12 of polyquinoxaline resin molded thereto. The laminated body portion is made up of alternating layers of fiberglass cloth 13 and polyquinoxaline resin 14. The fiberglass cloth is only partially impregnated with the resin so that the gasket has a high degree of resiliency in the thickness direction.

While the invention is described above with reference to a particular embodiment, it is to be understood that various changes and modifications to the procedures given above can be employed by one skilled in the art without departing from the invention. In particular the optimum temperatures for the various process step will vary somewhat with the particular type of polyquinoxaline polymer.

What is claimed is:

1. A gasket comprising a resilient laminated body of alternating layers of fiberglass cloth and polyquinoxaline resin, said fiberglass cloth being partially impregnated with said resin, and an encapsulating film of said resin molded over the entire surface of said body.

2. The gasket of claim 1 wherein said layers of resin in said laminated body are 1.8 to 2.2 mils thick.

3. The method of preparing a gasket which comprises:

a. stacking alternating sheets of uncured polyquinoxaline resin and fiberglass cloth;

b. heating the resulting stacked array at a temperature of 340° to 360° F while compressing said sheets together at a pressure of 25 to 35 psi to form a partially impregnated, laminated body;

c. covering the entire surface of said body with a film of polyquinoxaline resin, said film having been heated to a temperature of 280° to 320° F;

d. molding the film covered body at a temperature of 600° to 650° F and a pressure of 25 to 35 psi;

e. post-curing the molded gasket body by heating at a temperature of 675° to 700° F.

4. The method of claim 3 wherein said polyquinoxaline has the formula

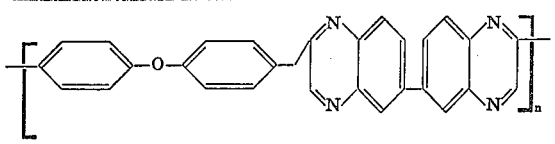

5. The method of claim 4 wherein the thickness of said resin sheet in said array is 1.8 to 2.2 mils.

6. The method of claim 5 wherein a portion of said body is cut away to leave only a gasket blank prior to covering the body surface with said film.

7. The method of claim 6 wherein said film is at least 3.5 mils thick.

8. The method of claim 6 wherein said molded body is deflashed prior to post curing.

9. The method of claim 6 wherein stacked array is heated at a temperature of about 350° F and a pressure of about 30 psi.

10. The method of claim 6 wherein said body is molded at a temperature of about 625° F and a pressure of about 30 psi.

* * * * *